United States Patent
Prucher (10) Patent No.: US 10,760,550 B2
(45) Date of Patent: Sep. 1, 2020

(54) BIASED SEGMENTED DUAL RADIAL GAP BRUSHLESS PMDC MOTOR/GENERATOR

(71) Applicant: Bryan Prucher, Clarkston, MI (US)

(72) Inventor: Bryan Prucher, Clarkston, MI (US)

( * ) Notice: Subject to any disclaimer, the term of this patent is extended or adjusted under 35 U.S.C. 154(b) by 0 days.

(21) Appl. No.: 16/122,292

(22) Filed: Sep. 5, 2018

(65) Prior Publication Data

US 2019/0085825 A1   Mar. 21, 2019

Related U.S. Application Data (63) Continuation-in-part of application No. 15/450,098, filed on Mar. 6, 2017, now Pat. No. 10,075,035.

(60) Provisional application No. 62/303,734, filed on Mar. 4, 2016.

(51) Int. Cl.
| | |
|---|---|
| *F03D 9/25* | (2016.01) |
| *H02K 3/50* | (2006.01) |
| *H02K 7/18* | (2006.01) |
| *H02K 21/24* | (2006.01) |

(52) U.S. Cl.
CPC ............ *F03D 9/25* (2016.05); *H02K 3/50* (2013.01); *H02K 7/183* (2013.01); *H02K 21/24* (2013.01); *F05B 2220/7066* (2013.01); *F05B 2220/7068* (2013.01); *H02K 2201/03* (2013.01); *H02K 2203/09* (2013.01); *H02K 2213/12* (2013.01)

(58) Field of Classification Search
CPC . F03D 9/25; H02K 3/50; H02K 7/183; H02K 21/24
See application file for complete search history.

(56) References Cited

U.S. PATENT DOCUMENTS

| | | | | | |
|---|---|---|---|---|---|
| 5,295,793 | A | * | 3/1994 | Belden | F03D 7/0216 416/10 |
| 5,405,246 | A | * | 4/1995 | Goldberg | F03D 3/061 416/227 A |
| 6,792,525 | B2 | * | 9/2004 | Mukherjee | G06F 9/383 712/235 |
| 9,197,116 | B2 | * | 11/2015 | Junge | H02K 1/276 |
| 2005/0116579 | A1 | * | 6/2005 | Ohiwa | H02K 7/14 310/254.1 |
| 2006/0104815 | A1 | * | 5/2006 | Siegfriedsen | F16H 1/48 416/170 R |
| 2010/0007225 | A1 | * | 1/2010 | Platon | H02K 1/14 310/45 |
| 2010/0285702 | A1 | * | 11/2010 | Platon | H02K 16/04 440/6 |
| 2011/0031756 | A1 | * | 2/2011 | Gabrys | F03D 3/02 290/55 |
| 2012/0262019 | A1 | * | 10/2012 | Smith | H02K 1/2766 310/156.07 |
| 2013/0020888 | A1 | * | 1/2013 | Anthony | F01D 15/10 310/52 |

(Continued)

*Primary Examiner* — Sean Gugger
(74) *Attorney, Agent, or Firm* — The Weintraub Group, P.L.C.

(57) ABSTRACT

A multiple radial gap BLPMDC/BLPMAC motor/generator suitable for direct drive wind or other fluid medium driven turbines or other rotary machine application. Each rotor and stator segment are housed in a fixture having an intermediate interior ramp angularly inclined at an angle of from about 10° to about 80° to cause the rotor/stator segments to interact at the axis of rotation of the fluid medium driven rotating machine at the same angle.

6 Claims, 6 Drawing Sheets

(56) References Cited

U.S. PATENT DOCUMENTS

| | | | |
|---|---|---|---|
| 2013/0214540 A1* | 8/2013 | Gelmini | H02K 5/1735 |
| | | | 290/55 |
| 2014/0009025 A1* | 1/2014 | Hosek | H02K 21/24 |
| | | | 310/156.48 |

* cited by examiner

BIASED SEGMENTED DUAL RADIAL GAP BRUSHLESS PMDC MOTOR/GENERATOR

CROSS-REFERENCE TO RELATED APPLICATION

This application is a continuation-in-part application of U.S. patent application Ser. No. 15/450,098, filed Mar. 6, 2017 for "Segmented Dual Radial Gap Brushless PMDC Motor/Generator which claims the priority benefit of U.S. Provisional Patent Application Ser. No. 62/303,734, filed Mar. 4, 2016, titled "Segmented Dual Radial Gap Brushless PMDC Motor/Generator," the entire disclosures of which, including the drawing, are hereby incorporated by reference.

BACKGROUND OF THE INVENTION

1. Field of the Invention

This invention relates generally to brushless, permanent magnet AC or DC rotary electrical motor/generators (BLPMAC/BLPMDC) machines used to convert a rotational mechanical power input into an electrical power output. More particularly, the present invention concerns modular BLPMAC/BLPMDC generators for use in direct drive applications. Even more particularly, the present invention relates to modular BLPMAC/BLPMDC motor/generators comprising individual modular segments for use in manufacturing wind turbines and other rotary devices or machines.

2. Description of the Prior Art

In the above referred to co-pending application there is described therein a multi-segmented modular brushless, permanent magnet DC (BLPMDC), generator for use in a wind turbine system. As noted in the above referred to co-pending application when the BLPMDC is deployed in a direct drive prior application this creates the need for a gear box.

Further, the modular segmented motor/stator assembly is suitable for use in a direct drive application for the generation of renewable power well in excess of one megawatt thereby making it feasible for use in large wind turbines and other rotary mechanism. However, it is to be appreciated that the assembly, per se, does not provide any flexibility along the X and Z axes. Furthermore, it is not an easy configuration to assemble.

As is detailed herein below the present invention addresses these issues by providing a biased plural gap motor/generator using the segmented modules described in the parent application.

SUMMARY OF THE INVENTION

The present invention provides a modular multiple radial gap BLPMDC motor/generator suitable for direct drive wind or other fluid medium driven turbines. Preferably, the motor/generator hereof employs a dual radial gap architecture such as described in U.S. Pat. No. 8,247,943, the disclosure of which is hereby incorporated by reference.

Each rotor segment includes a rotor frame 103 having a top wall and a pair of opposed sidewalls extending downwardly from and perpendicular to opposite ends of the top wall. The top wall and the sidewalls define an interior rotor channel. Each rotor segment further includes a plurality of magnet modules mounted within the rotor channel and arranged in alternating magnetic polarity. Each magnet module includes a metal band having a bight section, a pair of legs extending downwardly from opposite ends of the bight section, and a pair of inwardly facing magnets being disposed on respective legs and positioned within the channel.

Each stator segment includes a stator frame including a base and a pair of opposed sidewalls extending upwardly from and perpendicular to opposite ends of the base. The stator frame further includes a pair of shoulders extending inwardly from respective sidewalls. The base and the pair of sidewalls define an interior stator channel 121.

Each stator segment further includes a plurality of phase bus bars and at least one common bus bar disposed within the stator channel.

Each stator segment also includes a plurality of operatively connected stator induction modules being seated on the shoulder of the stator frame. Each stator induction module comprises a coil having electrical leads extending from opposing ends of the coil and at least one turn formed therebetween. Respective leads of each coil are electrically connected to one phase of a bus bar and a common bus bar.

A polymer mold formed from a thermally, non-electrically conductive polymer at least partially encapsulates the coil.

In use, the stator is fixed to a base, centered to share the same axis and plane as the rotor, and positioned so that the stator induction modules are nested within the rotating rotor channel. The rotor rotates about the stationary stator such that the plurality of magnet modules encircles the stator induction modules and provide an air gap between the coils and the opposing magnets.

The motor/generator has a pre-established, fixed gap between the rotor magnets and the coils.

In assembling the present motor/generator the rotor and stator segments are housed in a fixture. The upper portion of the fixture is configured such that, when in use, both the rotor and stator segments are disposed at an angle ranging from about 10° to about 80° with respect to the axis of rotation or center line of a rotary mechanism. In a wind turbine or similar rotary mechanism, this configuration enables the rotor and stator to be biased with respect to the Z axis.

The modular/segmented design of the motor/generator permits assembling the individual modules into separate segmented rotor and stator sub-assemblies which can be packaged as a kit.

For a more complete understanding of the present invention, reference is made to the following detailed description and accompanying drawing. In the drawing, like reference characters refer to like parts throughout the several views, in which:

DESCRIPTION OF THE INVENTION

As noted hereinabove the present invention incorporates by reference in its entirety co-pending U.S. patent application Ser. No. 15/450,098 including the drawings. Therefore, for purposes of clarity, much of that description will be omitted herefrom with the focus being on the advantages accruing with the rotor and stator in a biased orientation.

Figure 6:
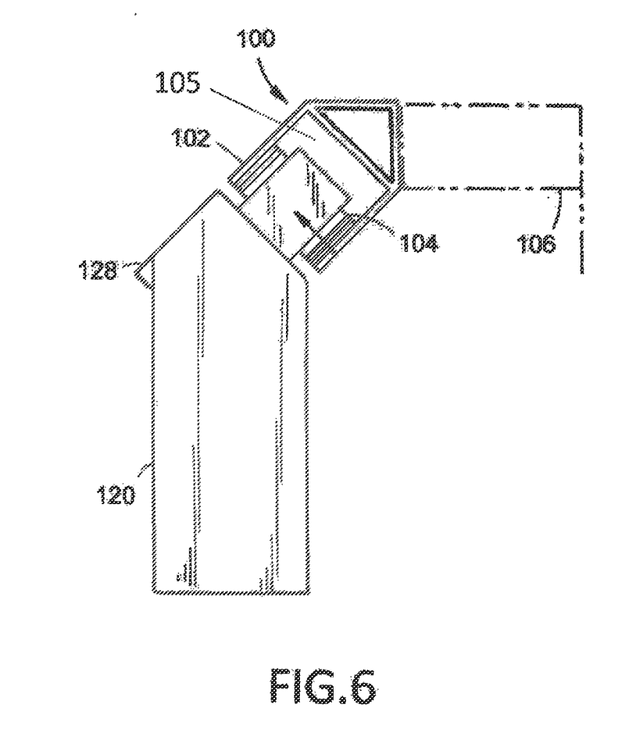
FIG. 6 is a perspective view showing an individual rotor/stator module.

Referring now to the drawing and, as shown, the present invention comprises individual segments or modules 10 being arrayed in a biased angularity with respect to the axis or center line of rotation of a rotating machine or, in the case of a wind turbine, inclined with respect to the axis of rotation, i.e., the Z-axis, as shown in FIG. 6.

It has been found that by incorporating the bias with respect to the Z axis at an angle ranging from about 10° to about 80° greater flexibility is imparted to the structure such that manufacturing tolerance is enhanced.

Preferably, the angular relationship ranges from about 30° to about 60° and, more preferably, about 45°. Using the 45° biased angle relative to the Z axis or the axis of rotation, increases the tolerance in the X and Z axis without any change to the gaps or loss of flux density.

Figure 2:
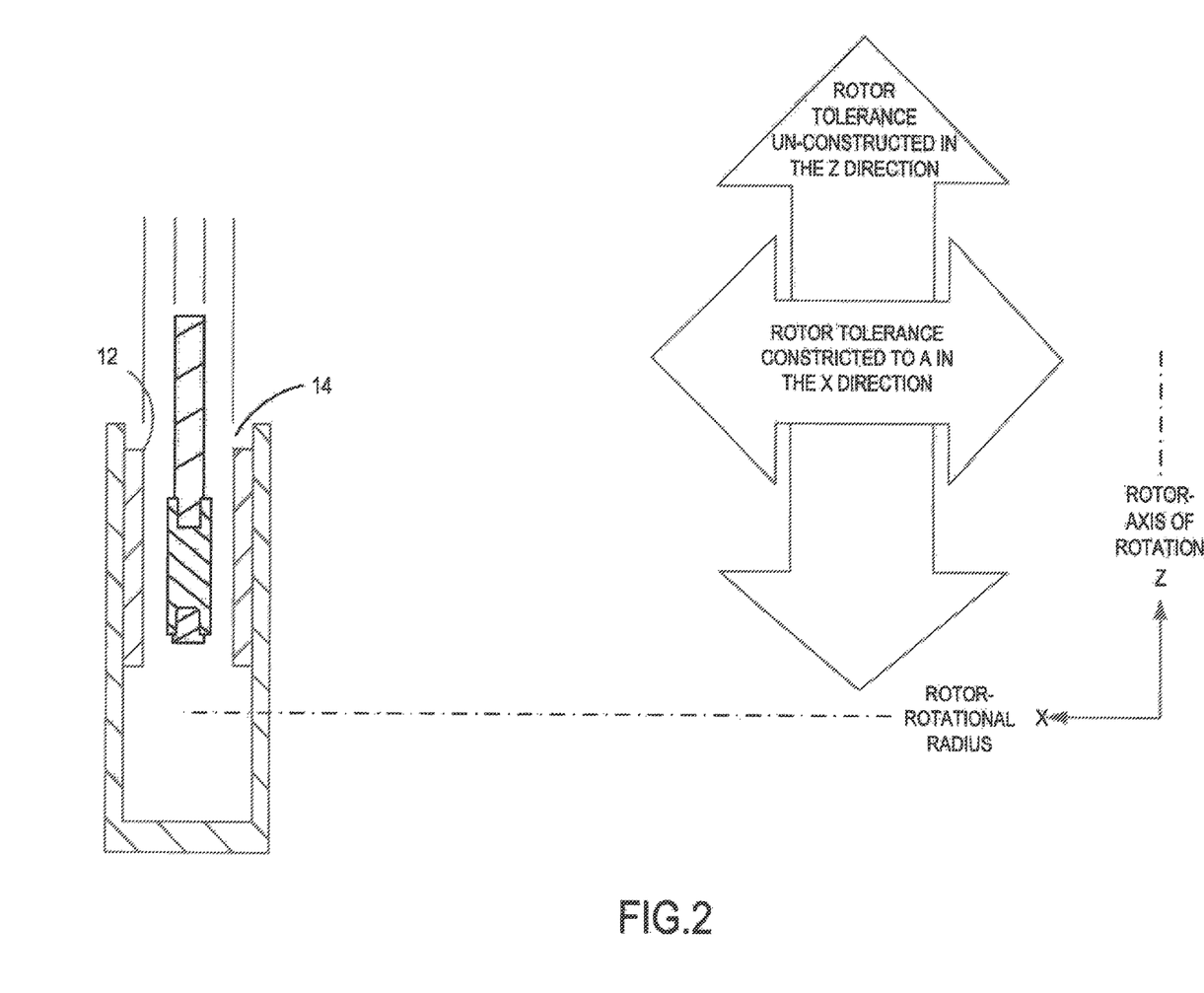
FIGS. 2 and 3 illustrate the constructions associated with a radial and axial dual gap motor, respectively.
Figure 3:
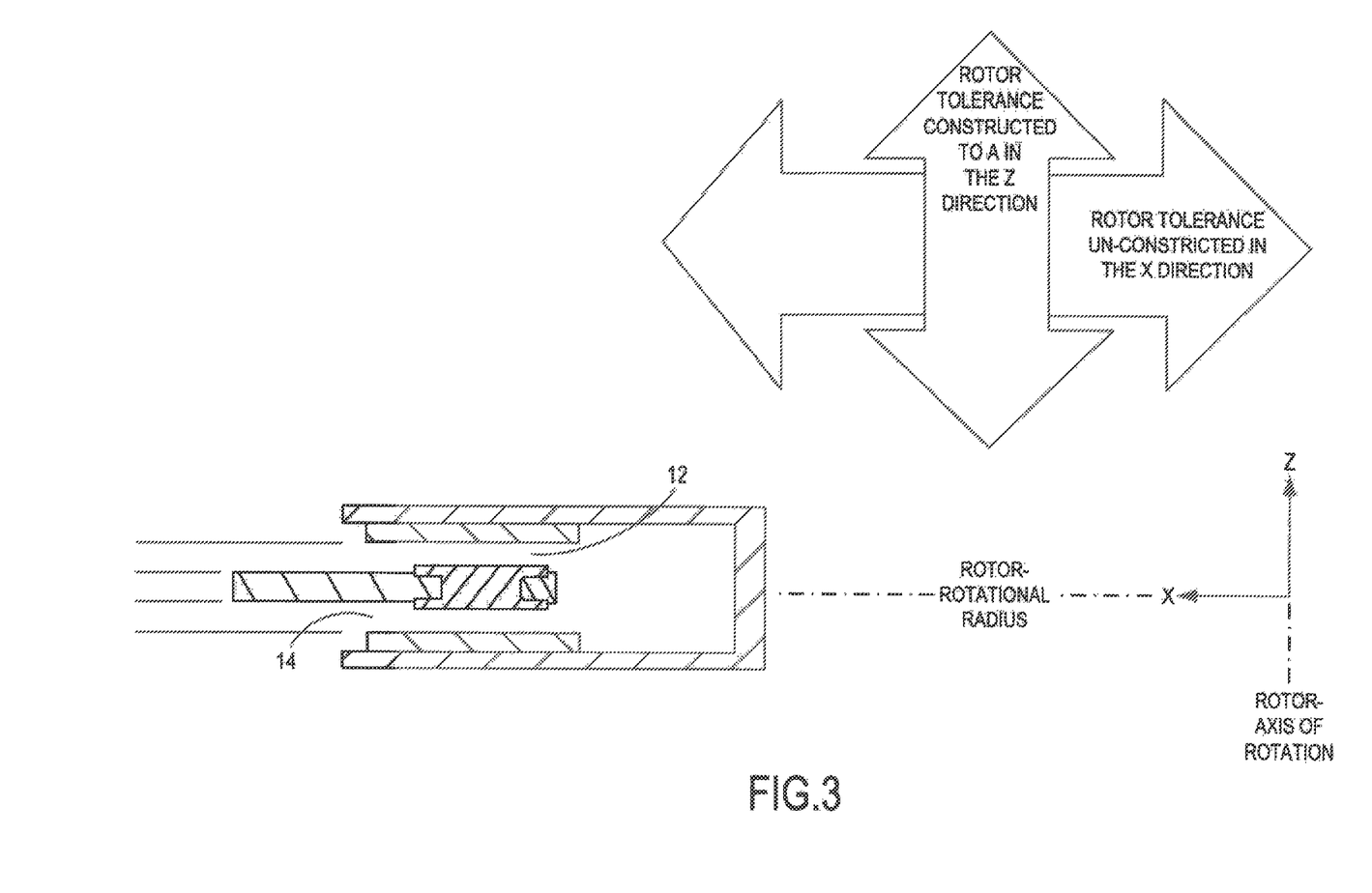
Figure 4:
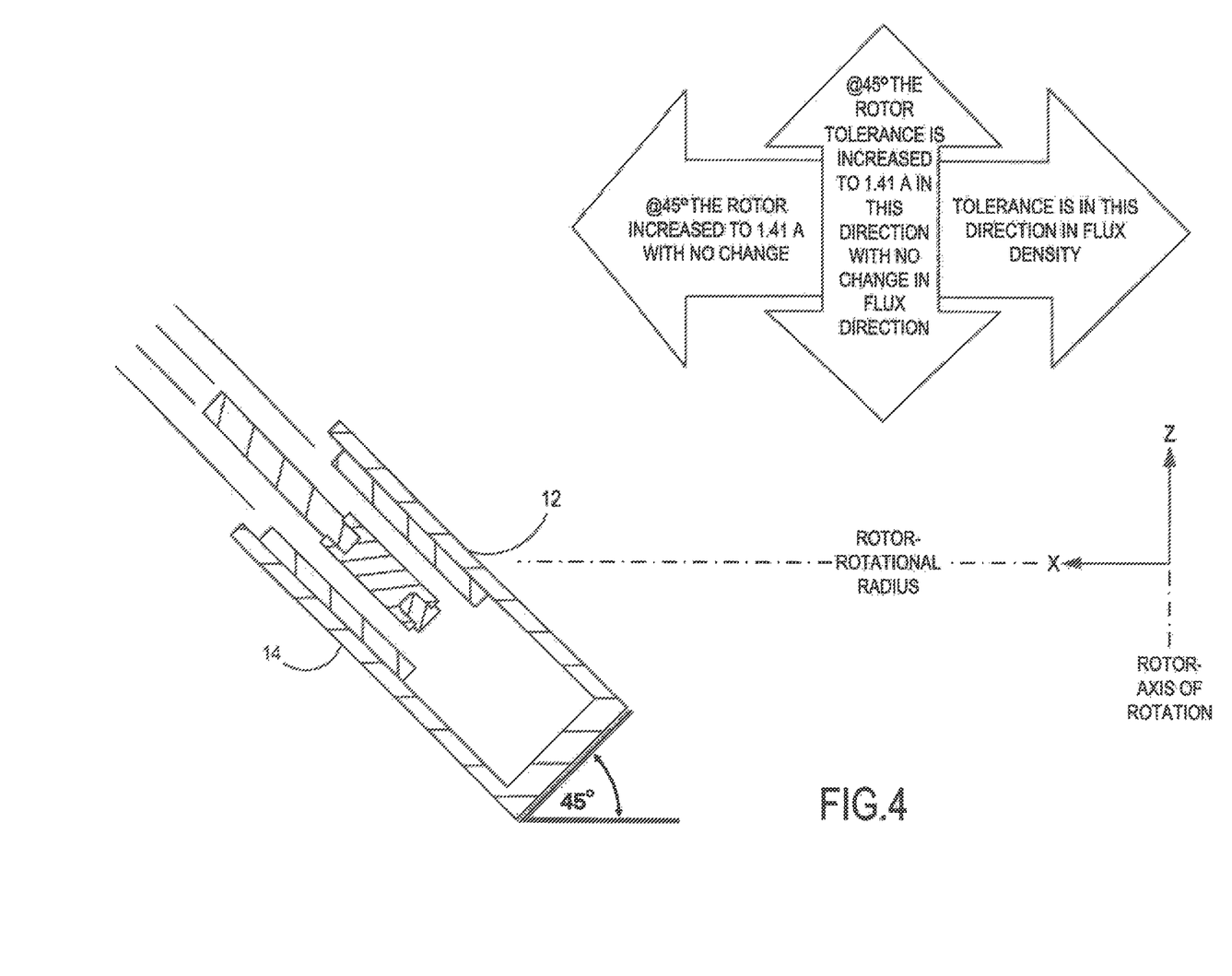
FIG. 4 illustrate the advantages associated with a biased dual gap motor.

Referring to FIGS. 2, 3 and 4, based upon the Pythagorean Theorem, there is shown that the load or tolerance in the Y-axis is increased to 1.41. The same is true with respect to the X axis. Thus, the angularity imparts the requisite desired flexibility.

Again, and as shown in FIGS. 2-4, a dual radial gap 12,14 is provided. One gap 12 exists between the stator and lower loaded magnet and a second gap 14 exists between the stator and upper loaded magnet.

It is to be appreciated that when the rotor and stator are both aligned such that the stator is disposed between the magnets with the module in a substantially vertical or axial array the rotor tolerance is constricted as to the gap while the rotor tolerance is unconstricted in the Z direction. When the module or individual segment is arrayed in a horizontal or radial direction the tolerance is constricted in both the horizontal X axis and unconstrained in the Z axis. The present invention reduces these constrictions by deploying the segments along the bias.

In all other respects the present motor/generator assembly is the same as described in the parent application.

Figure 5:
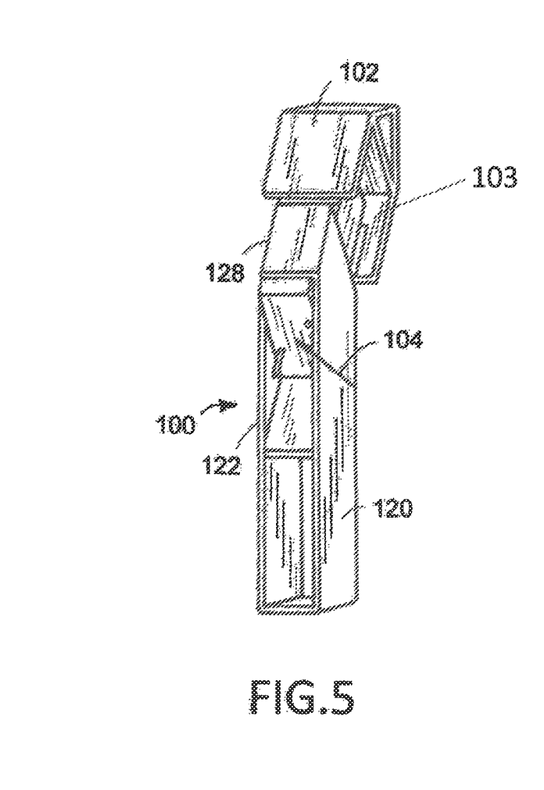
FIG. 5 is a side view of an individual rotor/stator module.
Figure 7:
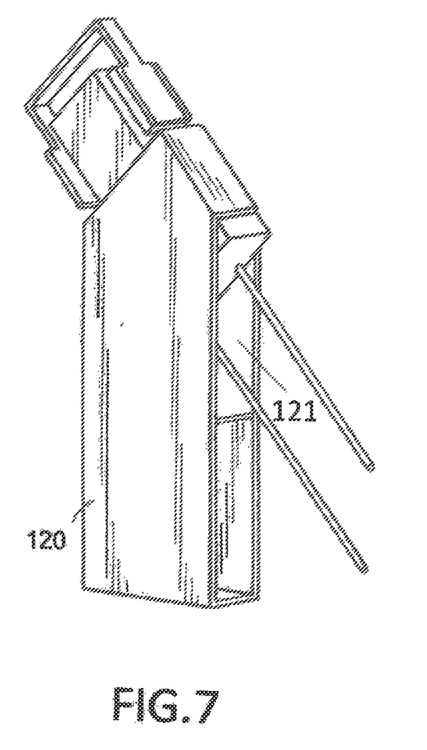
FIG. 7 is a perspective view of an assembled rotor/stator segment.

Referring again to the drawing and, in particular, FIGS. 5-7 there is shown therein, an individual module segment 100 comprising a rotor segment 102 and a stator segment 104 being loaded intermediate the rotor 102. The rotor, in turn, is operatively connected to a turbine 106 and the individual blades (not shown).

The rotor and stator segments are housed in a stator fixture or stator frame 120 having an intermediate interior wall or ramp 122. The ramp 122 is used to facilitate assembly of the present rotor/stator segments.

As is known to the skilled artisan, as the blades rotate the rotor, the rotor in turn, rotates and creates a magnetic field to thereby create an electrical current which is transmitted to the stator 104 comprising the segments 100 which stator, in turn, is connected, via coils (not shown), having lead wires 124 electrically connected to bus bars 126 for generating electricity in a manner well known to the skilled artisan.

With more particularity the present rotor/stator motor/generator has each rotor and stator segment 102,104 housed in the fixture 120.

The fixture has an upper portion 128. The upper portion of the fixture houses the rotor/stator segments. The ramp 122 is disposed in the fixture at an angle ranging from about 10° to about 80° with respect to the axis of rotation or center line 130 of a rotary mechanism 120, e.g., the turbine 106. Thus, concomitantly the rotor and stator are biased with respect to the Z axis.

In assembling the present rotor/stator assembly the stators are inserted into the rotor channel 105 between the encapsulated coils as disclosed in the co-pending application and which are disposed between the magnets of the rotor.

Figure 1:
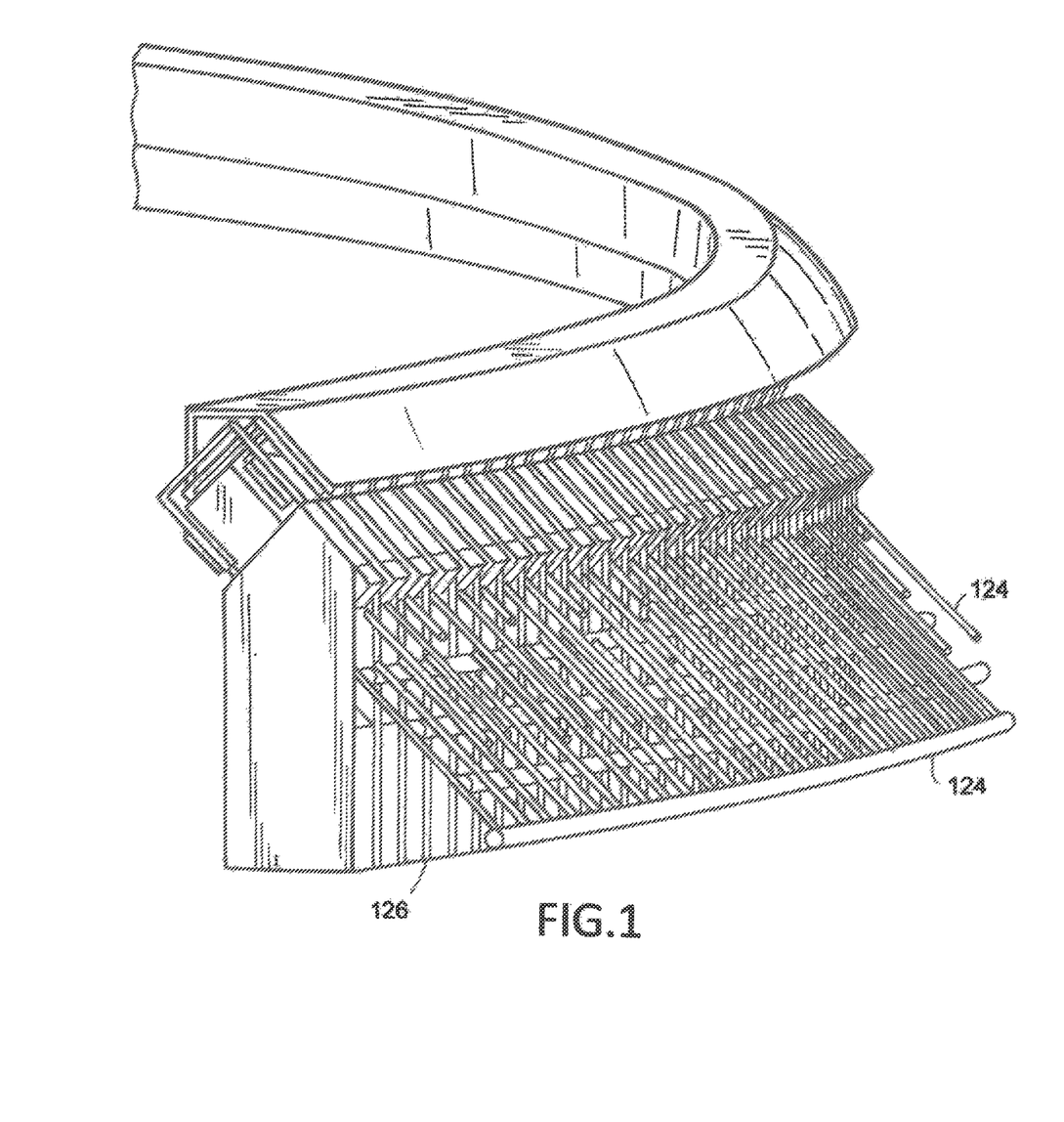
FIG. 1 is a broken perspective view of a wind turbine incorporating the rotor/stator individual modules of the present invention.

The coil wires 124 (FIG. 1) are then connected to the bus bars 126.

It is to be observed that a loading of the stators into their associated rotor channels is facilitated due to the biased configuration.

It is to be readily appreciated that in this configuration and, by the manner in which the assembly is achieved, repair and/or replacement is facilitated.

LIST OF REFERENCE NUMERALS

100 Individual module segment
102 Rotor segment
104 Stator segment
106 Turbine
108 Turbine blades
110 Segment fixture
112 Ramp
114 Stator
116 Coils
118 Fixture upper portion

Having thus described the invention, what is claimed is:

1. In a dual air gap motor/generator of the type having: (a) a rotor including a plurality of rotor segments, each one of the plurality of rotor segments including: a rotor frame having a rotor channel; and (b) a stator forming a circular rotor ring including a plurality of stator segments, forming a circular stator ring, each one of the plurality of stator segments including: (i) a stator frame having a stator channel; (ii) a plurality of bus bars disposed within the stator channel; (iii) a plurality of stator induction modules, the plurality of stator induction modules being seated on the a shoulder of the stator frame, the improvement, comprising:
   a fixture for each rotor and stator segment, each fixture including an angularly disposed ramp therewithin, each stator segment seating on the ramp at least, in part, the ramp being disposed at an angle ranging from about 10° to about 80° relative to the axis of rotation of a rotating machine.

2. The improvement of claim 1 further comprising:
   a plurality of lamination stacks, each one of the lamination stacks being disposed within and encircled by at least one turn of a respective coil, the plurality of lamination stacks being formed from a magnetically permeable material, thereby reducing the dual air gap between the coils and the opposing magnets.

3. The improvement of claim 1 further comprising:
   (a) a wind turbine rotor mechanically connected to the rotor in a direct drive application; and
   wherein the rotor and wind turbine rotor rotate simultaneously while the stator remains stationary, the rotor and stator being disposed at an angle of about 45° relative to the axis of rotation of the turbine.

4. A wind turbine comprising:
   the improved motor/generator of claim 1.

5. The wind turbine of claim 4 further comprising:
(a) a plurality of turbine rollers secured to the wind turbine rotor;
(b) a circular turbine guide rail for stabilizing the plurality of turbine rollers and rotation of the wind turbine rotor, and
(c) a plurality of support brackets securing the stator to the guide rail to ensure the stator remains stationary while the rotor and the wind turbine rotor rotate.

6. In a motor/generator of the type having a plurality of rotor segments and stator segments where the motor segments and stator segments form a circular motor/generator, the improvement comprising:
the rotor/stator assembly of claim 1.

* * * * *